Patented Mar. 4, 1924.

1,485,699

UNITED STATES PATENT OFFICE.

CHARLES E. NORTH, OF MONTCLAIR, NEW JERSEY, ASSIGNOR TO THE MILK OIL CORPORATION, A CORPORATION OF DELAWARE.

PROCESS OF MAKING BUTTER.

No Drawing. Application filed July 14, 1922. Serial No. 575,056.

*To all whom it may concern:*

Be it known that I, CHARLES E. NORTH, a citizen of the United States of America, residing at Montclair, in the county of Essex and State of New Jersey, have invented certain new and useful Improvements in Processes of Making Butter, of which the following is a full, clear, and exact description.

The invention which forms the subject of this application for Letters Patent is a new and useful process of making commercial butter by the use of milk oil. This, so far as I have any knowledge, has never been successfully accomplished heretofore, but that its accomplishment is most important and desirable, will appear from the following considerations.

According to the reports of the United States Department of Agriculture, forty per cent of the fluid milk produced naturally in this country is manufactured into butter. This butter is produced under the most diverse conditions, ranging from a fair degree of sanitary excellence to conditions so unsanitary and bad that the butter has very poor keeping properties and processes of renovation must be resorted to to render it capable of general or commercial use. The cost, moreover, of the raw material varies widely in different parts of the country according to the economic conditions under which such raw material is produced. The cost also varies with the season of the year following the rise and fall in the volume of production of the milk and cream.

The unsanitary conditions which obtain in the production of a very large proportion of the cream which is collected at centralizers and from which the greater part of commercial butter is made, result in a heavy percentage of spoilage and this is true to an extent that requires us to class butter, generally, as a perishable product.

More or less recent research and experiment have resulted in the production of what formerly was known as butter fat, but now more correctly, is known as milk oil. This product when recovered by an effective and proper process, is free from casein and bacteria and contains a negligible amount of moisture. The fat content can be maintained uniformly as high as ninety-nine and nine-tenths (99.9) per cent, as a result of which this oil has very excellent keeping qualities, due to the absence of moisture, bacteria and media for the development of bacteria and organisms which tend to cause spoilage. Milk oil, therefore, may not be classified as a perishable product, but may very properly be regarded as imperishable under all ordinary conditions including temperature.

This oil, if produced from fresh milk or cream, or from fresh sour cream at the sources of supply, under conditions which eliminate most of the unsanitary conditions that lead to the spoilage of butter, can be shipped to cities or centers of population, and should furnish a raw material for the production of butter at such points, which, theoretically, at least, should be far superior to the average butter now offered in the markets, and not subject to the spoilage which it is now estimated impairs at least fifty per cent of the butter produced at the present time; not only this but the cost of butter would be affected to a marked degree, could it be made from milk oil, because of the conservation resulting from the production of such oil in those localities best suited by climate or environment for the economical production of milk, and further because such conservation would include the utilization of surplus milk not only in local markets but whenever seasonal conditions such as the flush of milk in May and June, result in large surpluses at low prices.

Recognizing the advantages that would accrue from the making of butter from milk oil, both from the standpoint of sanitation and economics, investigators have for a long time unsuccessfully attacked this problem, until at the moment it is very generally understood and believed that it is not capable of practical solution. Milk oil at ordinary temperatures is solid, having somewhat the consistency and appearance of ordinary butter, and its melting point is identical with that of butter because the fats in both are the same. The oil, however, is homogeneous in texture, it being formed by the coalescence of the globules of the butter-fat contained in the milk. This coalescence or running together of the fat globules in a melted condition deprives the oil of any granular structure.

Butter, on the other hand, is composed of minute semi-solid particles of fat driven together by the process of churning into clusters of varying size. The several steps of butter-making are carried out at temperatures which do not permit these globules or clusters to melt, but press them together into a mass in such manner that the finished product presents a granular appearance. In other words, good market butter has a grain. Ordinary butter, of course, also contains casein which contributes largely to its flavor, as well as its odor. It also contains a substantial percentage of water.

To produce such a product from milk oil requires a process which will impart to it a granular texture, will add to it sufficient casein to produce the desired flavor, and a percentage of water corresponding to that met with in market butter.

Heretofore, and I believe I am stating practically all of the accomplishments of the prior art, various devices have been tried in the process of renovating spoiled butter by washing and melting the butter and churning the melted oil. This churning does not, however, produce a good grain because the fat clings together in masses too large to form granules. Oil has been sprayed into cold liquids, and this has, to some extent, simulated the desired granular appearance. Emulsified or artificial cream, because of the fact that in it the oil is transformed into small fat globules similar to those in natural milk, has been experimented with in an endless variety of ways for the making of butter, but all attempts to churn it have failed to produce the clusters or granules such as result from the churning of nautral cream. Such failures may be due to a difference in the size of the fat globules resulting from irregularities in the operation of the emulsifying machine, or to the character of the skim milk element of the emulsion. In other words, most of the dried skim milk powders are not soluble, or only partly soluble, and therefore do not furnish a serum suitable for maintaining an emulsion of milk fat which represents with sufficient accuracy the natural emulsion.

Whatever may be the reason for the failures in the past to produce butter by any kind of churning heretofore used from emulsified cream, the fact remains that it has not been successfully accomplished, and it is generally accepted by those versed in the art that it cannot be done.

This I have now disproved. It occurred to me that if a more vigorous and rapid agitation of the artificial cream than results from any ordinary process of churning were applied and used, the fat particles in such cream might be driven together into clusters which would closely approximate those granules produced by the churning of natural cream. I accordingly selected an ordinary ice-cream freezer of relatively large size and of the well known horizontal type, containing a revolving paddle. Under ordinary uses this paddle revolves on an average of forty to fifty times per minute in churning natural cream, or at about 200 times per minute in making ice-cream, but I geared it up to run at a speed of 700 or more revolutions per minute so that the agitation produced by it upon a body of fluid would be exceedingly violent as compared with the normal agitation of cream either in churning or in freezing to make ice-cream.

I then emulsified milk oil in one of the commercial forms of emulsifying machines together with the proper proportion of water and soluble dried skim milk powder, to produce an emulsified artificial cream. During the emulsifying process the temperature was maintained at about 100 degrees F., but the emulsified product was then chilled to 55 degrees F. before it was placed in the ice-cream freezer. After the latter had been operated at a speed of at least 700 revolutions per minute for a few minutes, usually about four, butter granules were produced to such an extent that the cream was completely churned. The butter granules were exactly similar in appearance to those produced in an ordinary churn with natural cream, and they kept their form under the usual process of washing and working producing what the best experts have pronounced to be a superior grade of butter.

In this way I have produced commercial butter which is accepted and sells as such. Further than I have stated above, I am unable at the present time to give more precise or scientific reasons for the result, but the fact that I have succeeded in making marketable butter by churning emulsified artificial cream, which all others have heretofore failed to do, is a practical demonstration of a marked and highly important advance in the art. So far as I am now informed this, my contribution to the art, is defined in the claims hereto annexed.

I claim as follows:—

1. The process herein described of making butter from emulsified artificial cream which consists in subjecting such cream to the usual churning process but with an agitation at a much more rapid rate and many times more violent than that produced in the ordinary churning of natural cream, whereby butter is produced in granular form.

2. The process herein described of making butter from emulsified artificial cream which consists in agitating the cream at the proper temperature by paddles revolving at the rate of about 700 revolutions per minute.

In testimony whereof I hereto affix my signature.

CHARLES E. NORTH.